(12) United States Patent
Krishnan et al.

(10) Patent No.: US 8,281,093 B1
(45) Date of Patent: Oct. 2, 2012

(54) SYSTEMS AND METHODS FOR CREATING CONSOLIDATED BACKUPS OF SNAPSHOT HIERARCHIES

(75) Inventors: Sasidharan Krishnan, Sunnyvale, CA (US); Suhas Urkude, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 425 days.

(21) Appl. No.: 12/627,498

(22) Filed: Nov. 30, 2009

(51) Int. Cl.
*G06F 12/00* (2006.01)
(52) U.S. Cl. .............................. 711/162; 711/6; 711/170
(58) Field of Classification Search ......................... None
See application file for complete search history.

(56) References Cited

U.S. PATENT DOCUMENTS

| | | | | |
|---|---|---|---|---|
| 7,165,154 | B2 * | 1/2007 | Coombs et al. | 711/162 |
| 7,818,299 | B1 * | 10/2010 | Federwisch et al. | 707/649 |
| 2008/0155223 | A1 * | 6/2008 | Hiltgen et al. | 711/173 |

* cited by examiner

*Primary Examiner* — Shawn X Gu
(74) *Attorney, Agent, or Firm* — Advantedge Law Group (57) ABSTRACT

A computer-implemented method for creating consolidated backups of snapshot hierarchies may include identifying a hierarchy of snapshots. The computer-implemented method may also include copying data in a root snapshot of the hierarchy to a backup. The computer-implemented method may further include, for each child snapshot in the hierarchy, copying valid data in the child snapshot to the backup. The computer-implemented method may additionally include copying information that identifies a parent of the child snapshot to the backup. Various other methods, systems, and computer-readable media are also disclosed.

18 Claims, 7 Drawing Sheets

SYSTEMS AND METHODS FOR CREATING CONSOLIDATED BACKUPS OF SNAPSHOT HIERARCHIES

BACKGROUND

Organizations increasingly rely on virtualization technologies to improve the flexibility, efficiency, and stability of their data centers. One aspect of virtualization involves provisioning virtual machines with data storage volumes. Since a family of virtual machines may have substantially overlapping data, a virtualization solution may provision the virtual machines with data volumes more efficiently through space-optimized snapshots. A space-optimized snapshot may store only a fraction of the data used by a virtual machine—the remainder of the data may reside in a parent volume or snapshot (e.g., a parent snapshot or volume may store data common to multiple child snapshots).

In some scenarios, an organization may wish to back up its virtual machines so that it may recover them in the event of disaster or corruption. In traditional solutions, a backup system may back up each region of data of each virtual machine. Regions of data actually stored in a snapshot corresponding to a virtual machine (or "valid" regions) may be read from the volume of the virtual machine directly. Regions of data residing in a parent volume or snapshot (or "invalid" regions) may be fetched from the parent volume or snapshot. Unfortunately, such invalid regions may be accessed and read from multiple times, since multiple child snapshots may reference the same invalid region. Such duplicative work may waste computing resources. Accordingly, the instant disclosure identifies a need for efficiently creating consolidated backups of snapshot hierarchies.

SUMMARY

As will be described in greater detail below, the instant disclosure generally relates to systems and methods for creating consolidated backups of snapshot hierarchies. Embodiments of the instant disclosure may create a consolidated backup of a snapshot hierarchy by leveraging the structure of the snapshot hierarchy to avoid duplicative operations. In one example, various systems described herein may accomplish this task by: 1) identifying a hierarchy of space-optimized snapshots, 2) copying data in a root snapshot of the hierarchy to a backup, and, for each child snapshot in the hierarchy: 3) copying valid data in the child snapshot to the backup, and 4) copying information that identifies a parent of the child snapshot to the backup.

The method for creating consolidated backups of snapshot hierarchies may be performed in a variety of contexts. For example, the snapshot hierarchy may be used to provision virtual machines. In this example, the method may include receiving a request to back up a volume of a virtual machine provisioned by the hierarchy. In one example, the method may include recursively traversing the hierarchy to identify each child snapshot in the hierarchy. The method may further include transforming the request to back up the volume of the virtual machine into a request to back up at least a part of the hierarchy.

In some embodiments, copying valid data in the child snapshot to the backup may include excluding invalid data from the copying. Valid data may include data stored in the child snapshot rather than in another snapshot in the hierarchy.

The method may include copying information that identifies the parent of the child snapshot to the backup in a variety of ways. For example, the method may include copying snapshot metadata from the hierarchy to the backup. In some embodiments, the method may include copying information to locate invalid data of the child snapshot to the backup.

The method may also include restoring a volume from the backup. In some examples, restoring the volume may include: 1) restoring valid data of the volume from a snapshot corresponding to the volume in the backup and 2) restoring invalid data of the volume from an ancestor of the snapshot corresponding to the volume in the backup.

In some examples, a system for creating consolidated backups of snapshot hierarchies may include an identification module and a copying module. The identification module may be programmed to identify a hierarchy of space-optimized snapshots. The copying module may be programmed to copy data in a root snapshot of the hierarchy to a backup. The copying module may also be programmed to copy, for each child snapshot in the hierarchy, valid data in the child snapshot to the backup. The copying module may further be programmed to copy information that identifies a parent of the child snapshot to the backup.

The identification module may be programmed in a variety of ways. For example, the identification module may be programmed to receive a request to back up a volume of a virtual machine provisioned by the hierarchy. In some embodiments, the identification module may be further programmed to transform the request to back up the volume of the virtual machine into a request to back up at least a part of the hierarchy of space-optimized snapshots. The identification module may also be programmed to recursively traverse the hierarchy to identify each child snapshot.

The copying module may be programmed in a number of ways. For example, the copying module may be programmed to, as part of copying valid data in the child snapshot to the backup, exclude invalid data from the copying. The valid data may include data stored in the child snapshot rather than in another snapshot in the hierarchy. The copying module may also be programmed to copy information that identifies a parent of the child snapshot to the backup in a variety of ways. For example, the copying module may be programmed to copy snapshot metadata from the hierarchy to the backup. The copying module may also be programmed to copy information to locate invalid data of the child snapshot to the backup.

In some examples, a computer-readable-storage medium may include one or more computer-executable instructions that, when executed by at least one processor of a computing device, cause the computing device to 1) identify a hierarchy of space-optimized snapshots, 2) copy data in a root snapshot of the hierarchy to a backup, and, for each child snapshot in the hierarchy: 3) copy valid data in the child snapshot to the backup and 4) copy information that identifies a parent of the child snapshot to the backup.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for creating consolidated backups of snapshot hierarchies. These systems and methods may be implemented in a variety of ways. In one example, various systems described herein may locate and backup the root volume or snapshot of the hierarchy (e.g., a "golden image" for the hierarchy). Various systems may then obtain a map of valid blocks for each child snapshot of the root. The valid blocks may be backed up, and the invalid blocks may be skipped. The identity of each child snapshot may also be backed up. If the snapshot hierarchy extends beyond the root and one level of child snapshots, each child of the child snapshots may be backed up in a similar way.

As will be explained below, by backing up elements of the structure of the snapshot hierarchy rather than backing up each virtual machine through the virtual machine's view of storage, the systems and methods described herein may save computing resources on a number of fronts. For example, since invalid regions may not be read or copied, less processing and fewer duplicative I/O operations may be required during backup. Furthermore, the size of the backup may be relatively small—approximately the size of the root image and the modified regions of the child snapshots—rather than including a full copy of data for each virtual machine. This may save storage space and/or deduplication processing resources. Additionally, the systems and methods described herein may allow for incremental backups of incomplete volumes.

Figure 1:
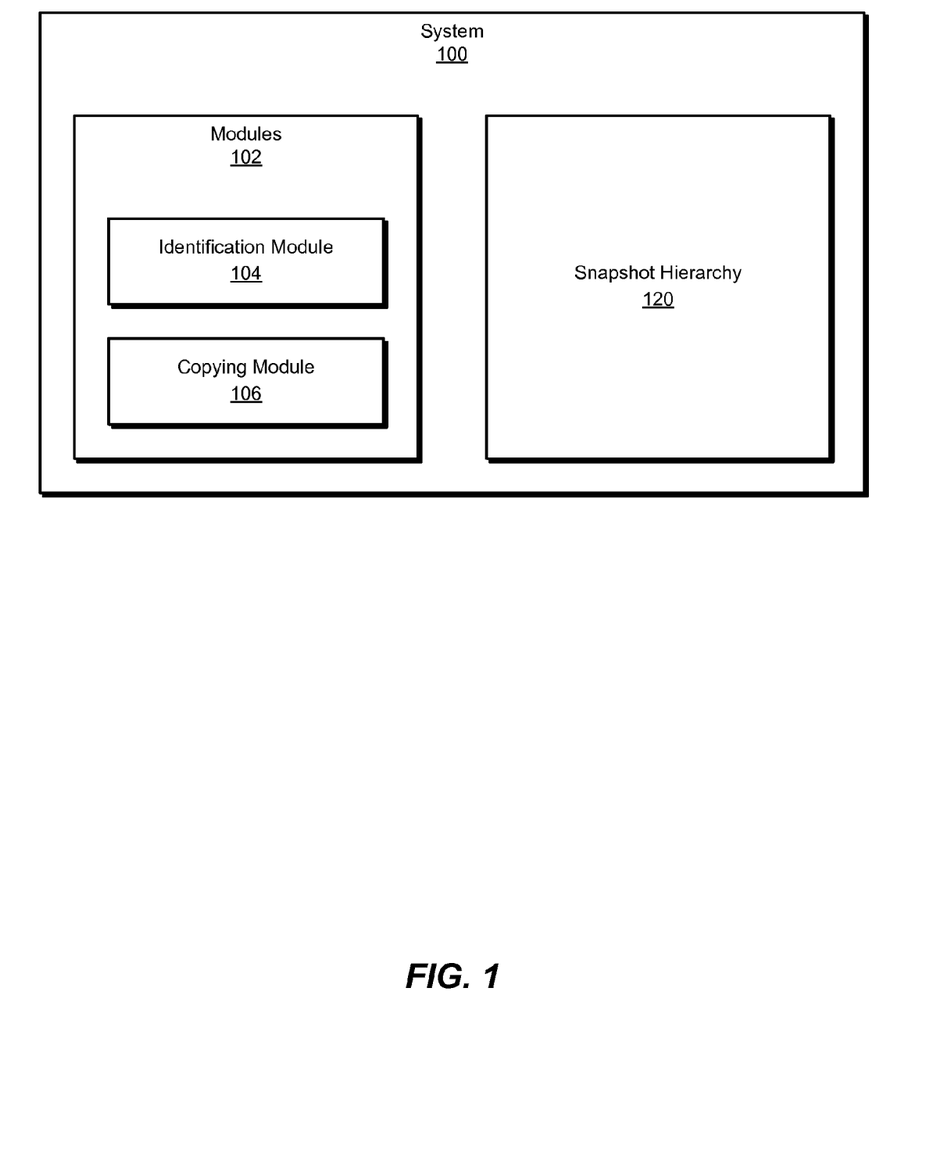
FIG. 1 is a block diagram of an exemplary system for creating consolidated backups of snapshot hierarchies.
Figure 2:
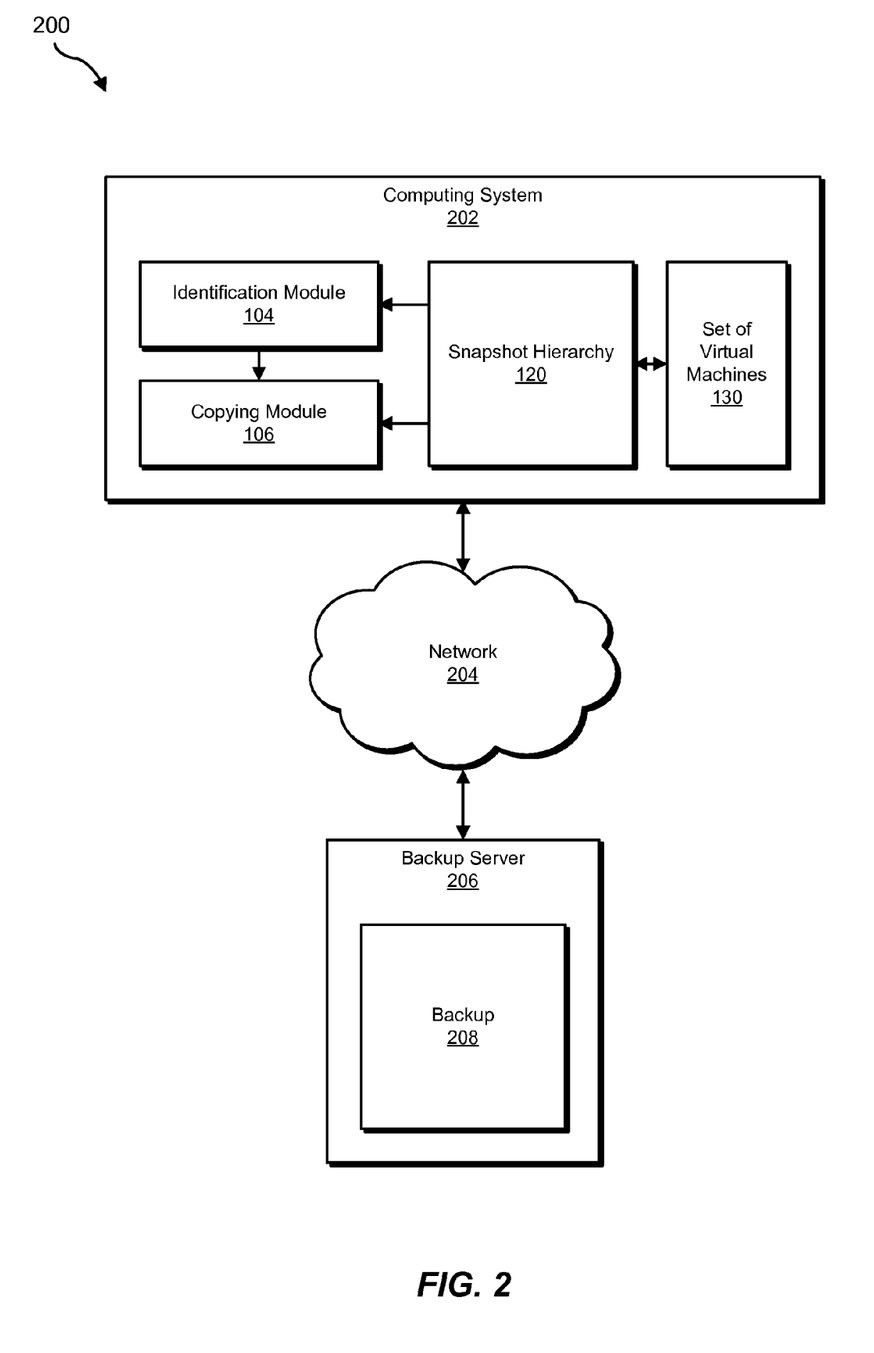
FIG. 2 is a block diagram of an exemplary system for creating consolidated backups of snapshot hierarchies.

The following will provide, with reference to FIGS. 1-2, detailed descriptions of exemplary systems for creating consolidated backups of snapshot hierarchies. Detailed descriptions of corresponding computer-implemented methods will also be provided in connection with FIGS. 3-4. An exemplary snapshot hierarchy will be described for illustrative purposes in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for creating consolidated backups of snapshot hierarchies. As illustrated in this figure, exemplary system 100 may include one or more modules 102 for performing one or more tasks. For example, and as will be explained in greater detail below, exemplary system 100 may include an identification module 104 programmed to identify a hierarchy of space-optimized snapshots.

In addition, and as will be described in greater detail below, exemplary system 100 may include a copying module 106 programmed to copy data in a root snapshot of the hierarchy to a backup and, for each child snapshot in the hierarchy, copy valid data in the child snapshot to the backup. Copying module 106 may also be programmed to copy information that identifies a parent of the child snapshot to the backup. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or backup server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include snapshot hierarchy 120. Snapshot hierarchy 120 may represent portions of one or more computing devices. For example, snapshot hierarchy 120 may represent a portion of computing system 202 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a backup server 206 via a network 204. In one embodiment, and as will be described in greater detail below, computing system 202 may be programmed to create a consolidated backup of a snapshot hierarchy (e.g., computing system 202 may be programmed to create a backup 208 of a snapshot hierarchy 120 used to provision a set of virtual machines 130).

To perform this task, identification module 104 may be programmed to identify a hierarchy of space-optimized snapshots (e.g., identification module 104 may be programmed to identify snapshot hierarchy 120 used to provision the set of virtual machines 130). Copying module 106 may then copy data in a root snapshot of the hierarchy to a backup (e.g., copying module 106 may copy data in a root snapshot of snapshot hierarchy 120 to backup 208). Additionally, copying module 106 may, for each child snapshot in the hierarchy, copy valid data in the child snapshot to the backup (e.g., copying module 106 may copy valid data from each child snapshot in snapshot hierarchy 120 to backup 208). Copying module 106 may furthermore copy information that identifies a parent of the child snapshot to the backup (e.g., copying module 106 may copy information that identifies a parent of the child snapshot to backup 208).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Backup server 206 generally represents any type or form of computing device that is capable of backing up data and/or facilitating the backing up of data. Examples of backup server 206 include, without limitation, backup media servers and hosts communicating with backup media servers.

Network 204 generally represents any medium or architecture capable of facilitating communication or data transfer. Examples of network 204 include, without limitation, an intranet, a wide area network (WAN), a local area network (LAN), a personal area network (PAN), a storage area network (SAN) (e.g., using Fibre Channel), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing system 202 and backup server 206.

Figure 3:
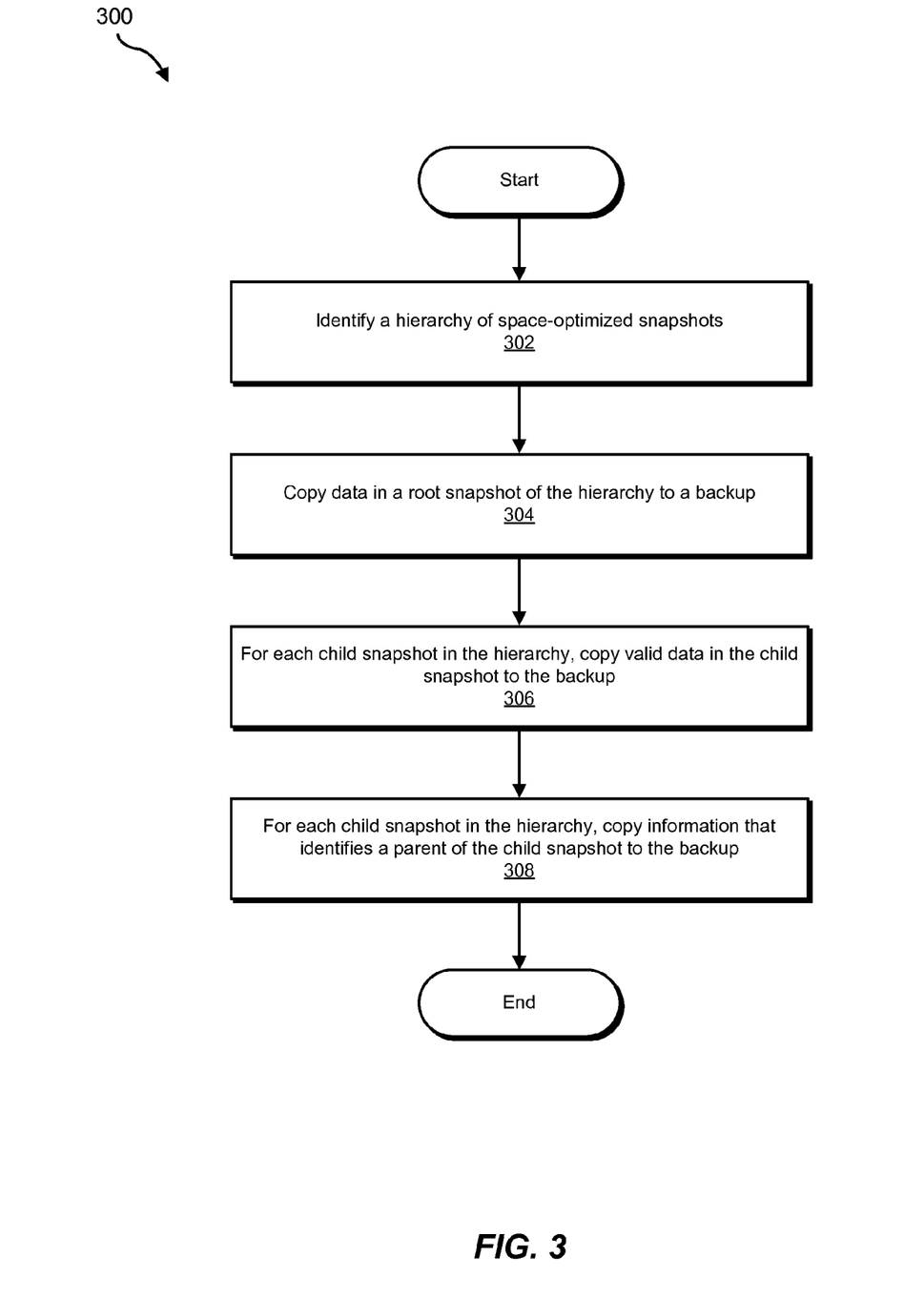
FIG. 3 is a flow diagram of an exemplary method for creating consolidated backups of snapshot hierarchies.

FIG. 3 is a flow diagram of an exemplary computer-implemented method 300 for creating consolidated backups of snapshot hierarchies. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a hierarchy of space-optimized snapshots. For example, at step 302 identification module 104 may, as part of computing system 202, identify snapshot hierarchy 120 used to provision the set of virtual machines 130.

As used herein, the phrase "space-optimized snapshot" may refer to any snapshot, data-cloning mechanism, and/or point-in-time capture of a data state that is based on a previous data state and reduces and/or minimizes redundant storage requirements through incorporating data from the previous data state by reference. For example, "space-optimized snapshot" may refer to a copy-on-write snapshot. As used herein, the term "hierarchy" as applied to snapshots may refer to any set of snapshots that are related by incorporating some of the same data by reference and/or by storing the incorporated data. The "hierarchy" may refer to all related snapshots or to a subset of related snapshots.

Identification module 104 may identify the hierarchy of space-optimized snapshots in a variety of contexts. For example, identification module 104 may read a configuration file that identifies the hierarchy. In another example, identification module may receive a message that identifies the hierarchy.

In some contexts, the hierarchy of space-optimized snapshots may be used to provision virtual machines. In such contexts, identification module 104 may receive a request to back up a volume of a virtual machine provisioned by the hierarchy. Identification module 104 may then determine that the virtual machine is provisioned by the hierarchy. Identification module 104 may receive the request to back up the volume of the virtual machine from a number of sources, such as a storage virtualization system for server virtualization (e.g., VERITAS VIRTUAL INFRASTRUCTURE), a backup media server (e.g., backup server 206), and/or a host communicating with a backup server.

In some embodiments, identification module 104 may also transform the request to back up the volume of the virtual machine into a request to back up at least a part of the hierarchy of space-optimized snapshots. By transforming the request, identification module 104 may help to ensure that the volume of the virtual machine is backed up efficiently rather than naively (e.g., by using steps described herein rather than by backing up the volume of the virtual machine through the storage view of the virtual machine).

In some cases, the hierarchy may only include a root volume or snapshot and a set of child snapshots descended directly from the root. In other cases, some of the child snapshots may also have child snapshots. In such cases, identification module 104 may recursively traverse the hierarchy to identify each child snapshot in the hierarchy. Identification module 104 may traverse the hierarchy in a number of contexts, such as when transforming a request to back up the volume of a virtual machine or to provide copying module 106 with the identities and relationships of the snapshots in the hierarchy.

Returning to FIG. 3, at step 304 one or more of the systems described herein may copy data in a root snapshot of the hierarchy to a backup. For example, at step 304 copying module 106 may, as part of computing system 202, copy data in a root snapshot of snapshot hierarchy 120 to backup 208. As used herein, the phrase "root snapshot" may refer to a snapshot, volume, and/or image (e.g., a "golden image") at the root of the snapshot hierarchy.

Copying module 106 may copy the data in the root snapshot to the backup in any suitable manner. For example, copying module 106 may simply copy each region of data in the root snapshot to the backup. Additionally or alternatively, copying module 106 may determine that some regions of the root snapshot are already stored in the backup (e.g., by matching fingerprints of the regions to fingerprints of regions stored in the backup), in which case copying module 106 may only need to copy the missing regions to the backup.

At step 306 one or more of the systems described herein may, for each child snapshot in the hierarchy, copy valid data in the child snapshot to the backup. For example, at step 306 copying module 106 may, as part of computing system 202, copy valid data from each child snapshot in snapshot hierarchy 120 to backup 208.

The valid data of a child snapshot may include any data stored in the child snapshot rather than in another snapshot in the hierarchy. For example, the valid data may include regions of data that changed between a snapshot and its child snapshot ("modified regions"). In some cases, the valid data may include regions of data that are synchronized between a snapshot and its child snapshot, and, accordingly, present in both ("current regions"). In some embodiments copying module 106 may copy all valid data from the child snapshot. Additionally or alternatively, copying module 106 may copy only the modified regions and not the current regions. In such embodiments, copying module 106 may copy references to instances of the current regions in the child snapshot's parent.

Copying module 106 may copy the valid data from the child snapshot to the backup in any suitable manner. For example, either identification module 104 or copying module 106 may obtain a bitmap of valid data regions for the child snapshot (e.g., from the fast mirror resynchronization feature of VERITAS VOLUME MANAGER or a similar feature of another storage virtualization system). Copying module 106 may then copy each valid data region to the backup. Copying module 106 may exclude invalid data from the copying (since the invalid data of the child snapshot is present in an ancestor of the child snapshot, the invalid data is copied when the relevant ancestor of the child snapshot is backed up).

Returning to FIG. 3, at step 308 one or more of the systems described herein may, for each child snapshot in the hierarchy, copy information that identifies a parent of the child snapshot to the backup. For example, at step 308 copying module 106 may, as part of computing system 202, copy information that identifies a parent of the child snapshot to backup 208.

The information identified as a parent of the child snapshot may include any suitable information. For example, copying module 106 may copy snapshot metadata from the hierarchy to the backup. In some embodiments, copying module 106 may copy only snapshot metadata that identifies relationships between snapshots (e.g., the parent, the ancestors, the children, and/or the descendents of the child snapshot). Additionally or alternatively, copying module 106 may copy all metadata of the child snapshot. In some examples, copying module 106 may simply copy the entire snapshot hierarchy intact to the backup. Copying module 106 may copy the metadata in its original format or reformat the metadata and copy the reformatted metadata to the backup.

In some contexts, copying module 106 may copy information to locate invalid data of the child snapshot to the backup. In doing so, copying module 106 may copy information that directly or indirectly identifies the parent of the child snapshot (e.g., the location of the invalid data may imply the identity of the parent of the child snapshot). As used herein, the phrase "invalid data" may refer to any data of a snapshot that is not valid data (e.g., data not stored within the snapshot, but referred to by the snapshot, whether explicitly or implicitly).

In one example, various systems described herein may create a consolidated backup of a snapshot hierarchy used to provision virtual machines when a storage virtualization system for server virtualization (such as VERITAS VIRTUAL INFRASTRUCTURE) or a backup server backs up one or more virtual machines in a snapshot hierarchy. Each virtual machine in the snapshot hierarchy may only have part of its data "valid." The valid data regions may be "current" (i.e., synchronized with a parent of the virtual machine) or "modified." The remaining data regions may be "invalid." The invalid data regions may be present in one of the ancestors of the virtual machine in the snapshot hierarchy. In order to create the consolidated backup, identification module 104 may identify a root node "R" of the snapshot hierarchy (i.e., a golden image). Copying module 106 may back up the root node "R." For each child snapshot "C" of root node "R," copying module 106 may 1) obtain a bitmap of valid blocks for the child snapshot "C" (the bitmap may be obtained from the fast mirror resynchronization feature of VERITAS VOLUME MANAGER or a similar feature of another storage virtualization system), 2) back up all valid (current or modified) bits for the child virtual machine, skipping the invalid regions, and 3) back up the identity of the child's parent (which may be the root node "R") for this backup instance. In some cases, large snapshot hierarchies may be backed up by recursively backing up virtual machines starting from the root node.

While the systems and methods described herein may be used to create consolidated backups of snapshot hierarchies used to provision virtual machines, some systems and methods described herein may be used to create consolidated backups of snapshot hierarchies in any suitable context.

In some embodiments, a method for creating consolidated backups of snapshot hierarchies may also include restoring a volume (e.g., of a virtual machine) from the backup. For example, copying module 106 may restore data stored in the backup in order to restore one or more volumes. In some embodiments, the method may include restoring the hierarchy of snapshots from the backup. For example, copying module 106 may restore data of the root snapshot and the valid data of each child snapshot from the backup, as well as hierarchy metadata that includes information that identifies relationships between snapshots in the hierarchy (e.g., the parent of each snapshot in the hierarchy).

Figure 4:
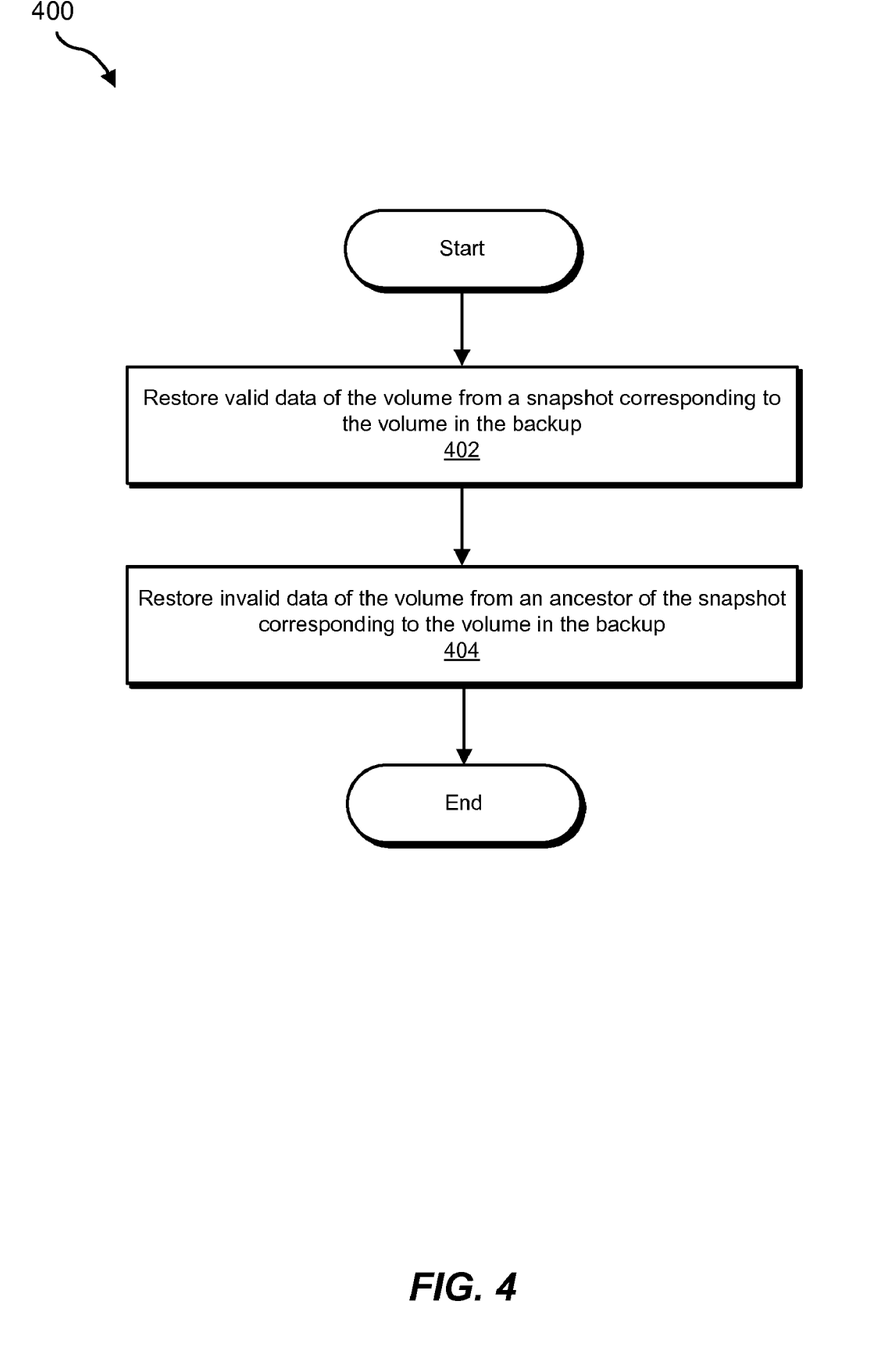
FIG. 4 is a flow diagram of an exemplary method for restoring consolidated backups of snapshot hierarchies.

FIG. 4 is a flow diagram of an exemplary computer-implemented method 400 for restoring volumes from consolidated backups of snapshot hierarchies. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

As illustrated in FIG. 4, at step 402 one or more of the systems described herein may restore valid data of a volume (e.g., of a virtual machine) from a snapshot corresponding to the volume in the backup. For example, at step 402 copying module 106 may, as part of computing system 202, restore valid data of a virtual machine in the set of virtual machines 130 from a snapshot corresponding to the virtual machine in backup 208.

Copying module 106 may restore the valid data in any suitable manner. For example, copying module 106 may copy all valid regions of data of the volume from the backup. In some contexts, copying module 106 may only need to restore certain valid regions (e.g., regions that were corrupted).

At step 404 one or more of the systems described herein may restore invalid data of the volume from an ancestor of a snapshot corresponding to the virtual machine in the backup. For example, at step 404 copying module 106 may, as part of computing system 202, restore valid data of a virtual machine in the set of virtual machines 130 from an ancestor of the snapshot corresponding to the virtual machine in backup 208.

Copying module 106 may restore the invalid data in a variety of contexts. For example, in the case of a disaster, copying module 106 may restore all snapshots in the snapshot hierarchy. In this example, copying module 106 may restore the invalid data of the virtual machine by restoring the data of an ancestor of the virtual machine. In another context, only a certain virtual machine may be restored from the backup (e.g., the state of the virtual machine as captured in the backup may not be represented by the state of any virtual machine provisioned by the snapshot hierarchy). In this example, copying module 106 may restore the invalid data of the virtual machine by copying the data of one or more ancestors of the virtual machine to the live instance of the virtual machine.

Figure 5:
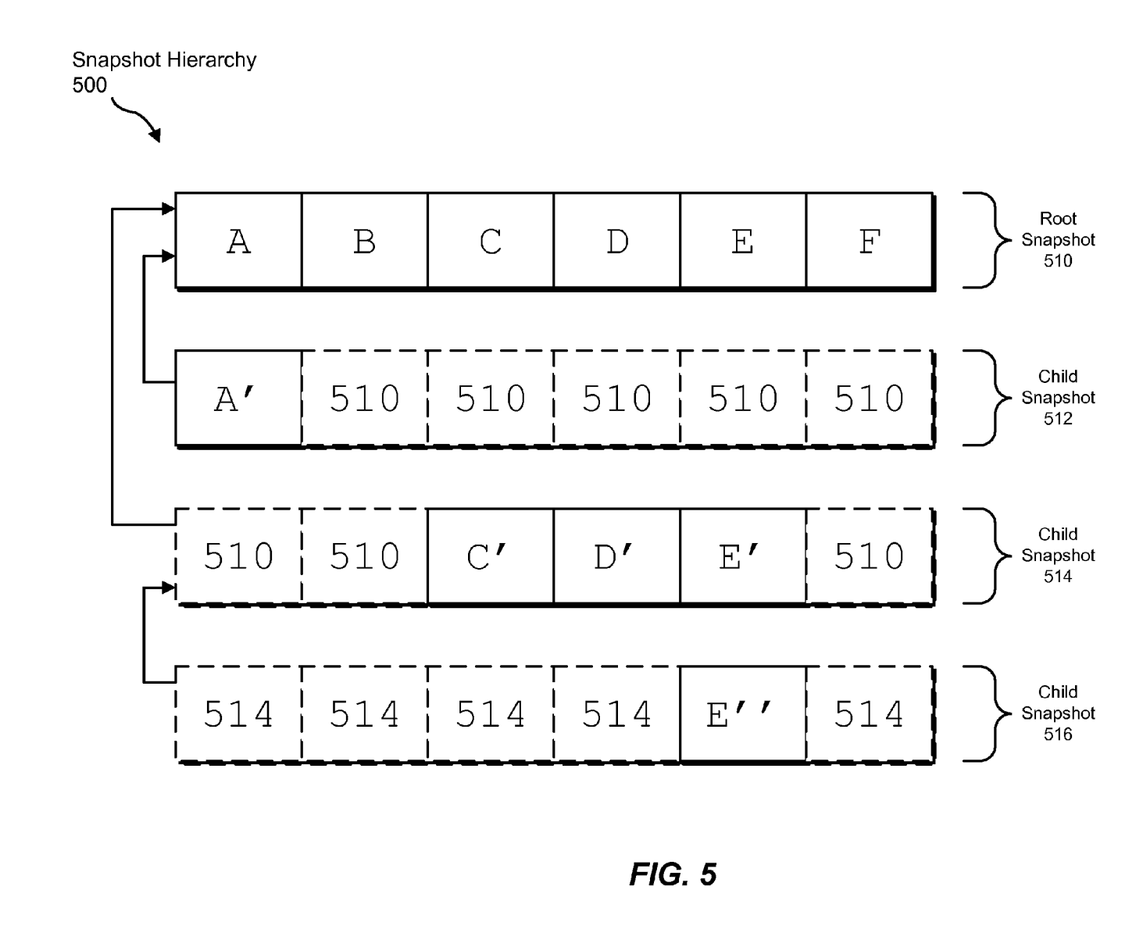
FIG. 5 is a diagram of an exemplary snapshot hierarchy.

FIG. 5 is a diagram illustrating an exemplary snapshot hierarchy 500. As illustrated, the exemplary snapshot hierarchy 500 includes a root snapshot 510. Root snapshot 510 has two child snapshots: a child snapshot 512 and a child snapshot 514. Child snapshot 514 has a child snapshot 516.

Root snapshot 510 is illustrated with 6 regions of data: A, B, C, D, E, and F. Child snapshot 512 differs from root snapshot 510 only in region A (being replaced with region A'). The remaining regions are identical between root snapshot 510 and child snapshot 512. Child snapshot 512 only stores region A'. Accordingly, A' is the only valid region in child snapshot 512. An attempt to access another region (such as region D) from child snapshot 512 would result in fetching that region from root snapshot 510, since that region would be invalid.

Child snapshot 514 has three valid regions: C', D', and E'. The remaining regions are invalid and would be fetched from root snapshot 510. Child snapshot 516 only has one valid region: E", differing from child snapshot 514 only in that region. An attempt to access region C' or D' in child snapshot 516 would result in fetching the corresponding region from child snapshot 514. An attempt to access region A, B, or F may result in attempting to fetch the corresponding region from child snapshot 514 but would ultimately result in fetching the corresponding region from root snapshot 510.

To perform a consolidated backup of this snapshot hierarchy, identification module 104 may first identify snapshot hierarchy 500. Copying module 106 may then copy the six regions of root snapshot 510 to a backup. Copying module 106 may further copy region A' of child snapshot 512 to the backup, along with information identifying root snapshot 510 as the parent of child snapshot 512. Likewise, copying module 106 may copy regions C', D', and E' of child snapshot 514 to the backup, along with information identifying root snapshot 510 as the parent of child snapshot 514. Additionally, copying module 106 may copy region E" of child snapshot 516 to the backup, along with information identifying child snapshot 514 as the parent of child snapshot 516.

Figure 6:
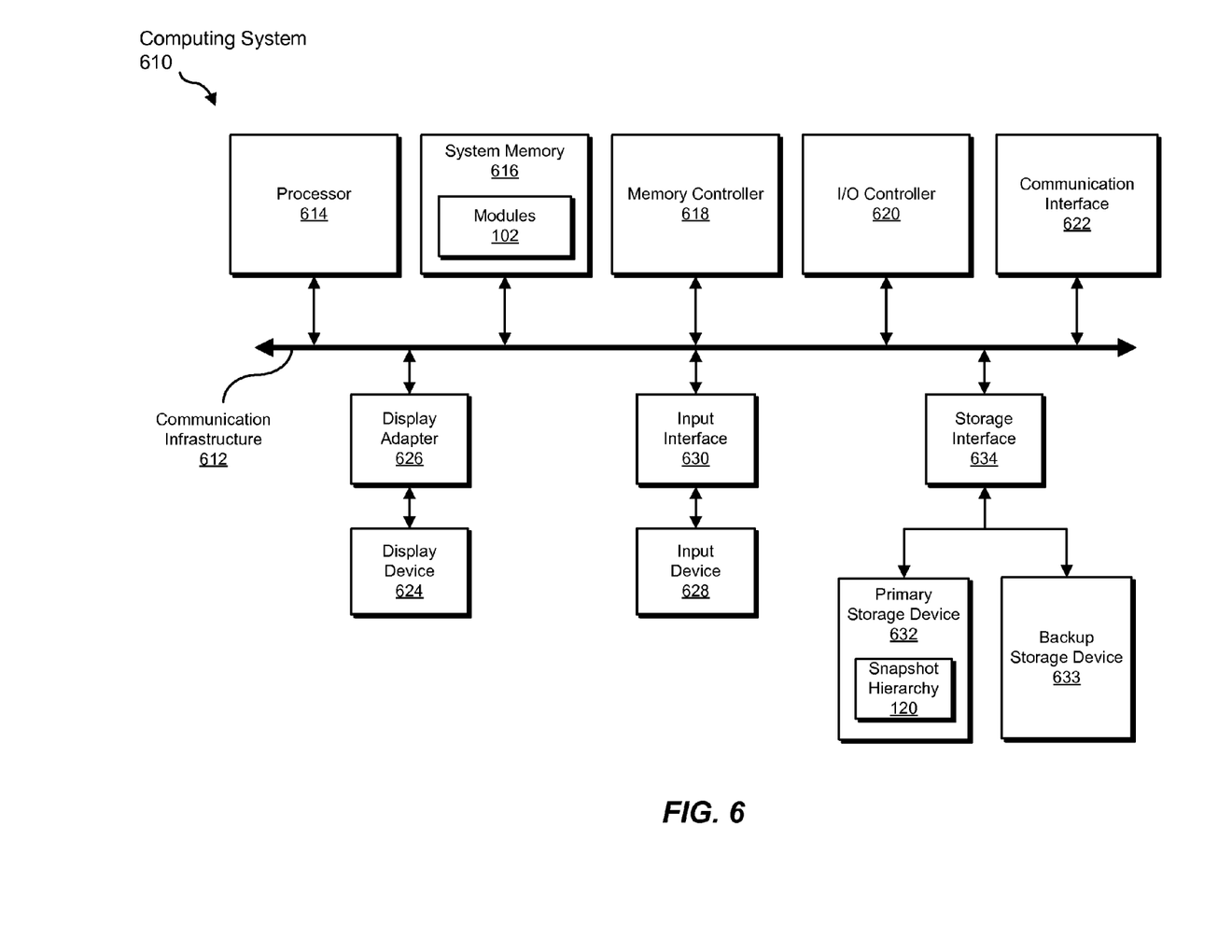
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, receiving, transforming, traversing, copying, excluding, and/or restoring steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, receiving, transforming, traversing, copying, excluding, and/or restoring.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, receiving, transforming, traversing, copying, excluding, and/or restoring steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, receiving, transforming, traversing, copying, excluding, and/or restoring steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, receiving, transforming, traversing, copying, excluding, and/or restoring steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, snapshot hierarchy 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, receiving, transforming, traversing, copying, excluding, and/or restoring steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
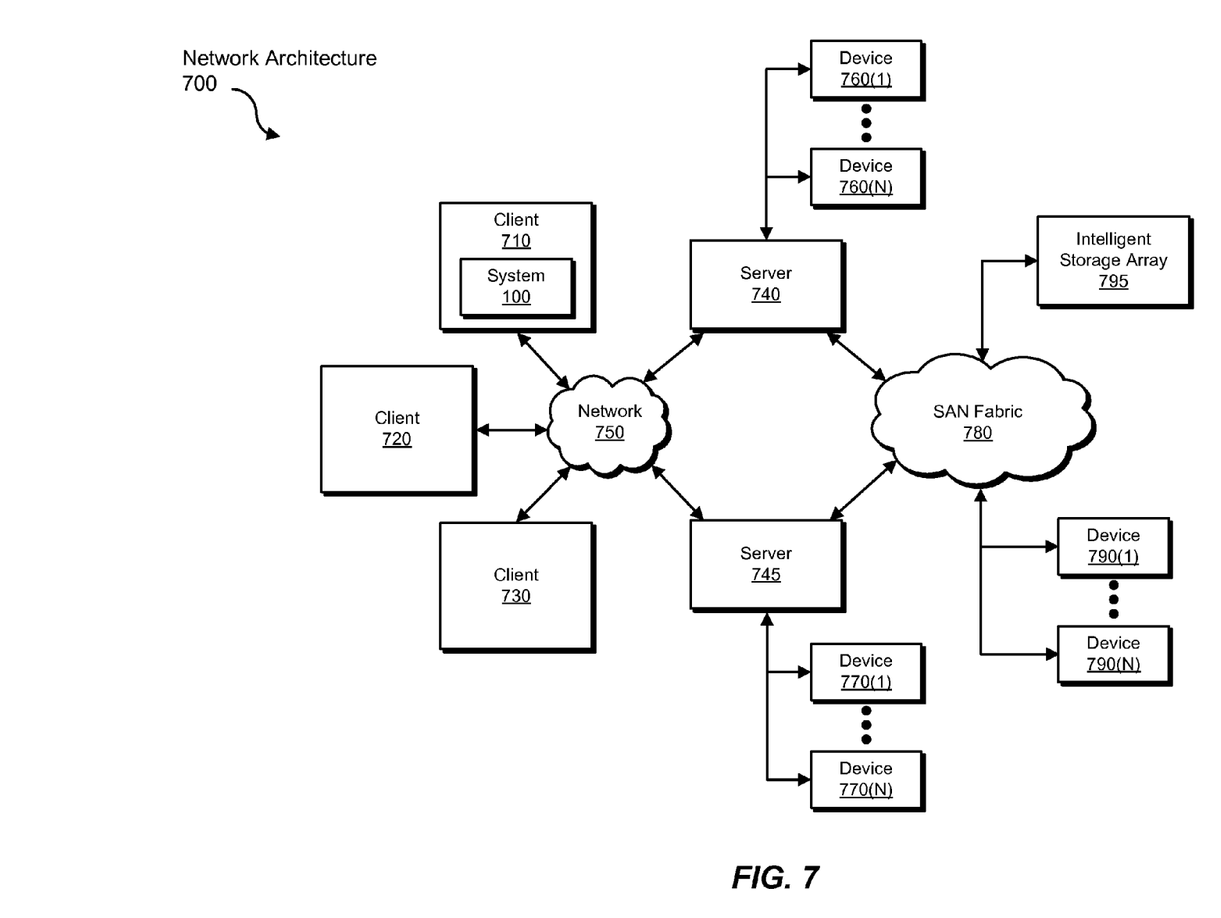
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, receiving, transforming, traversing, copying, excluding, and/or restoring steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for creating consolidated backups of snapshot hierarchies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing device into a device for creating consolidated backups of snapshot hierarchies. In another example, one or more of the modules described herein may transform a snapshot hierarchy into a consolidated backup of the snapshot hierarchy.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating consolidated backups of snapshot hierarchies, at least a portion of the method being performed by a computing device comprising at least one processor, the method comprising:
   identifying a hierarchy of space-optimized snapshots;
   receiving a request to back up a volume of a virtual machine provisioned by the identified hierarchy;

transforming the request to back up the volume of the virtual machine into a request to back up at least a part of the identified hierarchy of space-optimized snapshots;
copying data in a root snapshot of the identified hierarchy to a backup;
for each child snapshot in the identified hierarchy:
copying valid data in the child snapshot to the backup;
copying information that identifies a parent of the child snapshot to the backup.

2. The computer-implemented method of claim 1, wherein valid data comprises data stored in a child snapshot rather than in another snapshot in the identified hierarchy.

3. The computer-implemented method of claim 1, wherein copying information that identifies a parent of a child snapshot to the backup comprises copying information to locate invalid data of a child snapshot to the backup.

4. The computer-implemented method of claim 1, wherein copying information that identifies a parent of a child snapshot to the backup comprises copying snapshot metadata from the identified hierarchy to the backup.

5. The computer-implemented method of claim 1, further comprising recursively traversing the identified hierarchy to identify each child snapshot.

6. The computer-implemented method of claim 1, wherein identifying the hierarchy of space-optimized snapshots comprises identifying a hierarchy of space-optimized snapshots used to provision virtual machines.

7. The computer-implemented method of claim 1, further comprising restoring the volume from the backup.

8. The computer-implemented method of claim 7, wherein restoring the volume from the backup comprises:
restoring valid data of the volume from a snapshot corresponding to the volume in the backup;
restoring invalid data of the volume from an ancestor of the snapshot corresponding to the volume in the backup.

9. The computer-implemented method of claim 1, further comprising restoring the identified hierarchy of space-optimized snapshots from the backup.

10. The computer-implemented method of claim 9, wherein restoring the identified hierarchy of space-optimized snapshots from the backup comprises:
restoring valid data stored in each snapshot in the identified hierarchy from the backup;
restoring hierarchy metadata from the backup, the hierarchy metadata comprising information that identifies relationships between snapshots in the identified hierarchy.

11. The computer-implemented method of claim 1, wherein the copying valid data in a child snapshot to the backup comprises excluding invalid data from the copying valid data.

12. A system for creating consolidated backups of snapshot hierarchies, the system comprising:
an identification module programmed to:
identify a hierarchy of space-optimized snapshots;
receive a request to back up a volume of a virtual machine provisioned by the identified hierarchy;
transform the request to back up the volume of the virtual machine into a request to back up at least a part of the identified hierarchy of space-optimized snapshots;
a copying module programmed to:
copy data in a root snapshot of the identified hierarchy to a backup;
for each child snapshot in the identified hierarchy:
copy valid data in the child snapshot to the backup;
copy information that identifies a parent of the child snapshot to the backup;
at least one processor configured to execute the identification module and the copying module.

13. The system of claim 12, wherein valid data comprises data stored in a child snapshot rather than in another snapshot in the identified hierarchy.

14. The system of claim 12, wherein the copying module is programmed to copy information that identifies a parent of a child snapshot to the backup by copying information to locate invalid data of a child snapshot to the backup.

15. The system of claim 12, wherein the copying module is programmed to copy information that identifies a parent of a child snapshot to the backup by copying snapshot metadata from the identified hierarchy to the backup.

16. The system of claim 12, wherein the identification module is further programmed to recursively traverse the identified hierarchy to identify each child snapshot.

17. The system of claim 12, wherein the identification module is programmed to identify the hierarchy of space-optimized snapshots by identifying a hierarchy of space-optimized snapshots used to provision virtual machines.

18. A physical computer-readable medium comprising one or more computer-executable instructions that, when executed by at least one processor of a computing device, cause the computing device to:
identify a hierarchy of space-optimized snapshots;
receive a request to back up a volume of a virtual machine provisioned by the hierarchy;
transform the request to back up the volume of the virtual machine into a request to back up at least a part of the hierarchy of space-optimized snapshots;
copy data in a root snapshot of the hierarchy to a backup;
for each child snapshot in the hierarchy:
copy valid data in the child snapshot to the backup;
copy information that identifies a parent of the child snapshot to the backup.

* * * * *